United States Patent [19]
Martin et al.

[11] 3,902,550
[45] Sept. 2, 1975

[54] HEAT EXCHANGE APPARATUS

[75] Inventors: Barrie James Martin, Brentwood; Michael John Broad, Enfield, both of England

[73] Assignee: Plessey Handel und Investments A.G., Zug, Switzerland

[22] Filed: Feb. 6, 1973

[21] Appl. No.: 330,141

[30] Foreign Application Priority Data
Feb. 17, 1972  United Kingdom................ 7296/72

[52] U.S. Cl. ................ 165/104; 122/4 D; 23/288 S
[51] Int. Cl. ............................................. F28d 13/00
[58] Field of Search ................... 165/104; 23/288 S; 122/4 D

[56] References Cited
UNITED STATES PATENTS

| | | | |
|---|---|---|---|
| 2,185,929 | 1/1940 | Simpson et al. ................ | 165/104 X |
| 2,513,369 | 7/1950 | Shaw .............................. | 23/288 S X |
| 2,585,274 | 2/1952 | Reichl ............................ | 23/288 L X |
| 2,595,384 | 5/1952 | Johnson et al. ................. | 23/288 S |
| 2,782,019 | 2/1957 | Turney et al. .................. | 23/288 S X |
| 3,482,946 | 12/1969 | Shirk ............................. | 23/288 S X |

Primary Examiner—Albert W. Davis, Jr.
Attorney, Agent, or Firm—Scrivener Parker Scrivener & Clarke

[57] ABSTRACT

Heat exchange apparatus such as a central heating boiler in which a fluid bed of particulate material is supported on a plate, said plate being provided with apertures which vary in size and/or density per unit area of the plate to provide more solid plate per unit area in portions of the plate positioned below auxiliary apparatus arranged in the fluid bed than in portions of the plate positioned below parts of the fluid bed not provided with the auxiliary apparatus. The auxiliary apparatus may be heating elements or water coils and the distribution pattern of the apertures in the plate enables uniform fluidisation of the bed.

3 Claims, 4 Drawing Figures

HEAT EXCHANGE APPARATUS

This invention relates to heat exchange apparatus having a fluid bed of particulate material.

Many known types of heat exchangers employ fluid beds of particulate material. In order that the fluid beds provide a high heat transfer coefficient, it is necessary that they be substantially uniformly fludised. Hitherto, such substantially uniform fluidisation has not always been achieved.

In many types of the known heat exchangers, and also in the heat exchanger of the present invention, a fluid bed is supported on an apertured plate. Hot gases pass through the apertures in the plate and into the fluid bed, thereby fluidising it. Hitherto, the apertures in the plate have been uniformly arranged throughout the plate and have been of uniform size. Such uniform aperture size and spacing ensures that the gases can pass substantially uniformly into the fluid bed and thereby substantially uniformly fluidise it.

In many instances, auxiliary apparatus is buried in the fluid bed. For example, water conduits may be buried in the fluid bed so that when the bed becomes hot and water is passed through the conduits, heat is transferred from the hot bed to the water. Alternatively, for example, heating elements can be buried in the bed for heating the bed and, in this case, cold gases will usually be passed through and heated by the bed. The hot gases leaving the bed are then usually passed to a second heat exchanger wherein the heat from the gases is used to heat water or other fluids.

We have now found that the gases pass more easily through the fluid bed in regions of the bed adjacent the auxiliary apparatus than in regions of the bed not provided with the auxiliary apparatus. It would appear that the auxiliary apparatus provides a path of least fluid resistance through the bed by causing local thinning of the bed. Because the gases pass more easily through the bed in the region of the bed adjacent the auxiliary apparatus, there is obviously a non-uniform passage of gases through the bed and this results in a non-uniform fluidisation of the bed with a resulting poor heat transfer coefficient. We have also found that uniform passage of gas through a fluid bed containing buried auxiliary apparatus can be achieved by making it more difficult for the gases to pass through the plate supporting the fluid bed in portions of the plate positioned below the auxiliary apparatus than in portions of the plate positioned below parts of the fluid bed not provided with the auxiliary apparatus.

Accordingly, the present invention provides heat exchange apparatus in which a fluid bed of particulate material is supported on a plate, said plate being provided with apertures which vary in size and/or density per unit area of the plate to provide more solid plate per unit area in portions of the plate positioned below auxiliary apparatus in the fluid bed than in portions of the plate positioned below parts of the fluid bed not provided with the auxiliary apparatus, whereby, during use of the heat exchange apparatus, substantially uniform fluidisation of the fluid bed is achieved.

The heat exchange apparatus of the present invention may be of any desired size and can be used to constitute a boiler arrangement for domestic central heating systems. Alternatively, the heat exchange apparatus may be used to receive hot exhaust gases from internal combustion engines, such for example as motor vehicles, the fluidised bed being used to burn uncombusted hydrocarbons in the hot exhaust gases. Also, if desired, the fluidised bed may contain one or more catalysts to remove impurities such for example as sulphur. It will be apparent that such use of the heat exchange apparatus of the present invention is effective in atmosphere pollution control. Similarly, gas turbines can be worked in conjunction with the apparatus of the present invention to reduce atmospheric pollution.

In some cases, the apertures in the plate may be so large that an appreciable percentage of the particulate material, for example sand, will fall through the plate. If gas and/or air is forced through the plate and fluidised bed at sufficient pressure, some of the falling particulate bed will be forced back up into the bed, but particulate losses may still be excessive. In order to prevent undesired loss of particulate material, it is preferred to place on top of the plate a metal sponge, gauze or mesh which acts to retain the majority of the particles in the fluid bed. A presently preferred metal sponge is the nickel-chromium metal sponge sold by the Dunlop Company under the Trade Mark "RETIMET". This Retimet sponge does not cause too much resistance to the passage of gases through the apparatus.

The plate supporting the fluid bed will usually be of metal but other materials, e.g. ceramic materials, can be used if desired. In some instances, the plate and the sponge, gauze or mesh may become non-uniformly heated by the hot gas and distortion or failure of the plate or sponge, gauze or mesh may result. Such undesired distortion or failure can be prevented or reduced by peripherally loosely trapping the plate and/or the sponge, gauze or mesh with an insulating material, e.g. asbestos. The insulating material enables the plate and/or the sponge, gauze or mesh to uniformly heat up and the loose trapping enables slight expansion to take place.

Many types of particulate material may be employed for the fluid bed, examples of such materials being well known. A presently preferred material is sand although other materials which can be used are, for example, silicon carbide and some metals.

Embodiments of the invention will now be described by way of example and with reference to the accompanying drawings in which.

Figure 1:
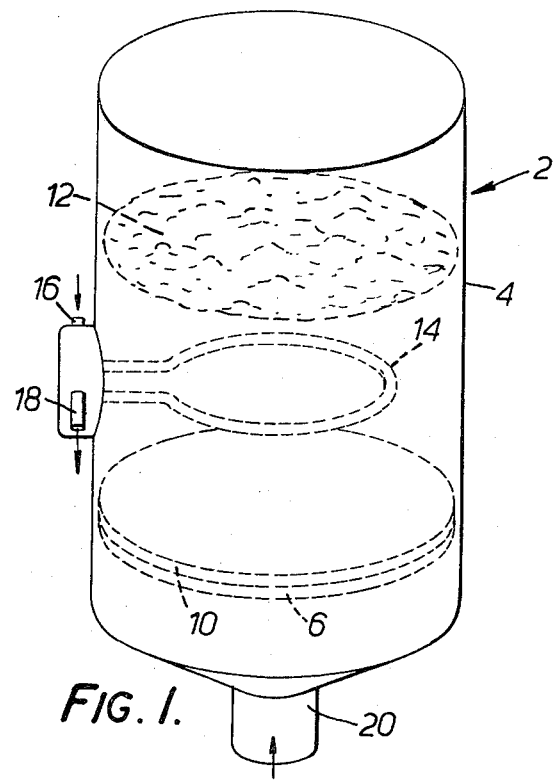
FIG. 1 is a view showing a first embodiment of the heat exchange apparatus in accordance with the invention.
Figure 2:
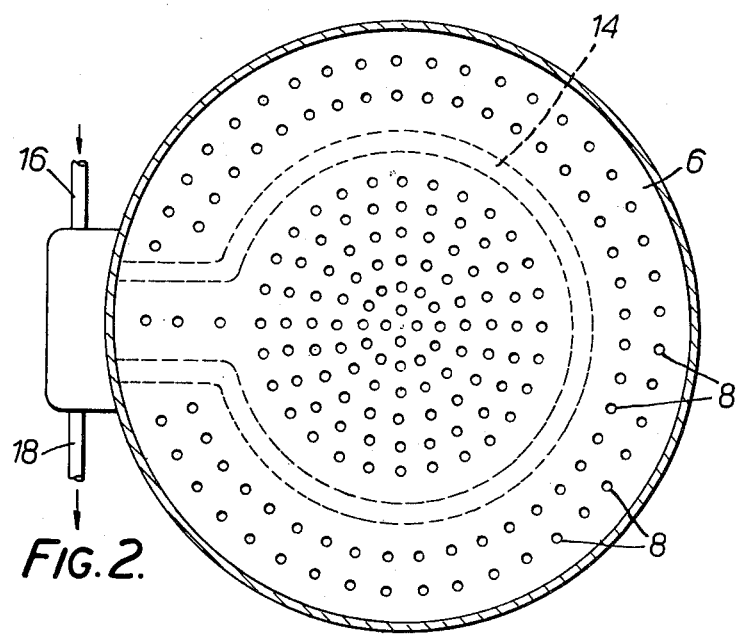
FIG. 2 is a top view of the heat exchange apparatus shown in FIG. 1.

Referring to FIGS. 1 and 2, there is shown heat exchange apparatus in the form of a boiler 2 having a housing 4. Positioned within the housing 4 is a plate 6 provided with apertures 8 as shown in FIG. 2. Positioned on top of the plate 6 is a Retimet metal sponge plate 10. The plates 6 and 10 in effect form a laminate and support thereabove a fluid bed 12 of sand. Positioned within the fluid bed 12 is a conduit 14 adapted to allow water to pass therethrough via a water inlet 16 and a water outlet 18.

The bottom of the housing 4 is generally frustoconical in shape and it is provided with an inlet 20. Hot gas, e.g. at 1000°C., passes up through this inlet 20 and passes through the apertures 8 in the plate 6, through the Retimet sponge plate 10 and into the fluid bed 12, thereby heating up the sand. It will be noted from FIG. 2 that no holes have been drilled in the plate 6 over that portion of the plate 6 which is positioned below the conduit 14. This is because the hot gas will generally find it easiest to pass through the fluid bed in the immediate vicinity of the conduit 14 and therefore no apertures 8 have been provided in the plate 6 below the conduit 14. Alternatively, some apertures or holes of smaller cross-section than the apertures in the remainder of the plate 6, or a few apertures of the same size as the apertures in the remainder of the plate 6, could have been provided in the area of FIG. 2 which is presently shown to be without apertures. The general effect of the arrangement shown in FIG. 2 is to ensure that the hot gas passes uniformly through the bed 12 and uniformly fluidises it. This enables the attainment of a high transfer coefficient and enables optimum heating of water or other fluid passing through the conduit 14 via the inlet 16 and the outlet 18.

Although not shown, it would of course be possible to surround the housing 4 with a water jacket to assist in heating the water, thereby making optimum use of all the hot surface area of the fluid bed 12.

In a further alternative arrangement, the heat exchange apparatus could be designed as shown in FIGS. 1 and 2 except that the conduit 14 would be replaced by an electrical heating element. In this case, the gases entering the inlet 20 would be cold and would become heated in the fluid bed 12, the fluid bed being heated to the required temperature by means of the electrical heating element. The hot gases would then leave the fluid bed 12 and could pass to a second heat exchange apparatus connected in series with the heat exchange apparatus shown in FIG. 1. In this second heat exchange apparatus, the hot gases could be used to heat up water or other liquid as desired.

Figure 3:
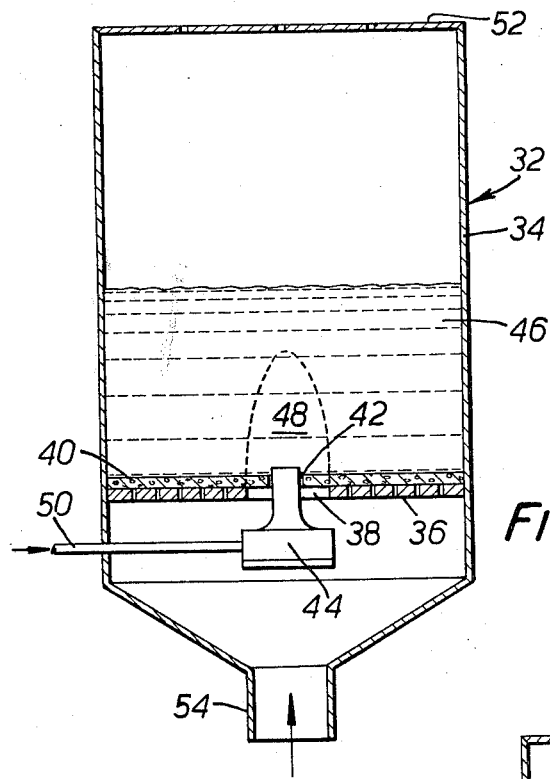
FIG. 3 is a cross-section through a second embodiment of the heat exchange apparatus in accordance with the invention.

Referring now to FIG. 3, there is shown heat exchange apparatus 32 comprising a housing 34. Positioned within the housing 34 is a metal plate 36 which is appropriately provided with apertures of the type shown at 8 in FIG. 2 and is also provided with a large central aperture 38. Positioned above the plate 36 is a Retimet sponge plate 40 which is provided with a central aperture 42 of smaller diameter than the aperture 38. In some cases, holes (not shown) may also be drilled around the aperture 42 to allow the increased passage of air through the plate 40 in the vicinity of an ultrasonic atomiser injector 44, which is positioned within the apertures 38 and 42. A fluidised bed 46 is held in position resting on the plates 36 and 40 and is violently fluidised in the conical area 48 shown in the vicinity of the injector 44, which injector 44 is provided with fuel by means of a fuel conduit 50.

A particulate-retaining perforated plate 52 has been shown in FIG. 3 positioned on top of the housing 34. The plate 52 acts to retain any particles which pass up through the housing 34 with the fuel/air mixture. The presence of the plate 52 is not essential, and care should be taken in choosing the mesh of the plate because otherwise it may tend to become prematurely clogged. In an alternative embodiment, not shown, the plate 52 may be replaced by a cyclone separator which separates the fluid bed particles from the fuel/air mixture and returns them to the fluid bed. Initially, air is introduced into the heat exchange apparatus 32 via the air inlet 54.

Figure 4:
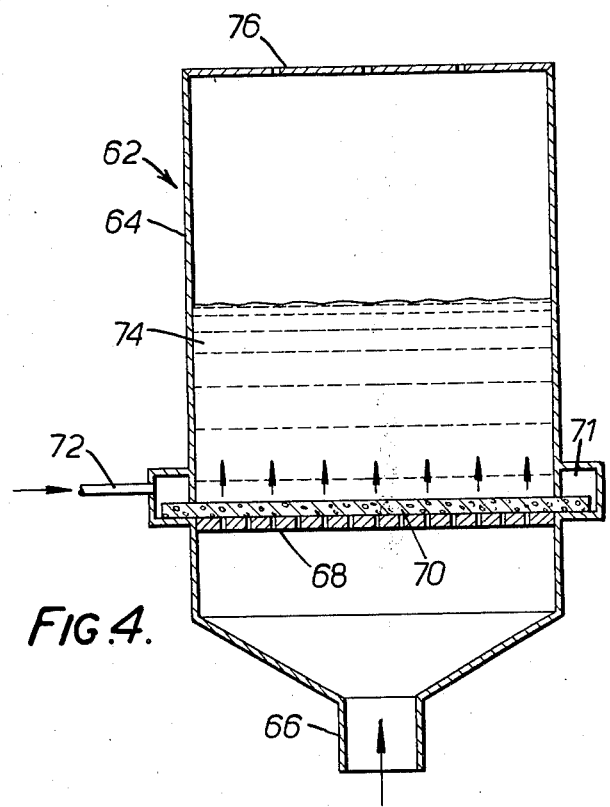
FIG. 4 is a cross-section through a third embodiment of the heat exchange apparatus in accordance with the invention.

Referring now to FIG. 4 there is shown a heat exchange apparatus 62 having a housing 64. The lower part of the housing 64 is conically shaped and is provided with an air inlet 66. Air passes upwardly through the air inlet 66 and through an apertured metal plate 68. No auxiliary apparatus has been shown in FIG. 4 but such auxiliary apparatus may be present if desired. When no auxiliary apparatus is buried in the fluid bed 74, then the apertures in the plate 68 preferably do not extend too closely to the edge of the plate 68 because the inner surface of the housing 64 provides a path of least fluid resistance.

Positioned above the plate 68 is a Retimet plate 70 which is thicker than the plates 10 nd 40 used in the heat exchangers illustrated in FIGS. 1 to 3. Fuel is supplied at low pressure to the heat exchange apparatus 62 via a fuel inlet 72 and a fuel gallery or store 71. This fuel soaks into the Retimet plate 70 which acts like a wick and extends into the fuel gallery 71. The air passing through the Retimet plate 70 picks up the said fuel and allows it to be burnt in the fluidised bed 74 which is provided with ignition means (not shown). If the bed 74 is at a temperature of above 700°C., the fuel will combine with the air, releasing heat without visible flame. The apertures in the plate 68 will be reduced or non-existent in the region below the ignition means. As in the case of FIG. 3, the heat exchange apparatus 62 of FIG. 4 is provided with a top particulate retaining plate 76. As mentioned previously in connection with FIG. 3, the particulate-retaining plate is not necessary and may be replaced by a cyclone separator.

Also within the scope of the invention is a heat exchanger having a wick arrangement as illustrated for example in FIG. 4 and a fluid bed supporting plate which is uniformly apertured throughout its entire surface.

What we claim is:

1. Heat exchange device in which a fluid bed of particulate material is supported on a plate positioned within a housing and in which auxiliary heat exchange apparatus is provided in said fluid bed and is spaced apart from said plate so that part of said fluid bed is present between said auxiliary apparatus and said plate, said plate being provided with apertures which vary in density per unit area of the plate in both longitudinal and transverse directions to provide more solid plate per unit area in portions of the plate positioned below said auxiliary apparatus in the fluid bed than in portions of the plate positioned below parts of the fluid bed not provided with the auxiliary apparatus, whereby, during use of the heat exchange apparatus, substantially uniform fluidization of said fluid bed is achieved, and means for conducting a gaseous fluid through said apertures.

2. Heat exchange apparatus according to claim 1 in which a metal sponge, gauze or mesh is positioned on top of the apertured plate.

3. Heat exchange apparatus according to claim 1 in which a nickel-chromium metal sponge is positioned on top of the apertured plate.

* * * * *